United States Patent
Quaife

(10) Patent No.: US 9,438,038 B1
(45) Date of Patent: Sep. 6, 2016

(54) POWER SUPPLY FAST TURN-ON AND INCREASED HOLD-UP TIME WITHIN AN ELECTRICAL DEVICE

(75) Inventor: Philip Richard Quaife, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1184 days.

(21) Appl. No.: 13/430,334

(22) Filed: Mar. 26, 2012

(51) Int. Cl.
*H02J 1/10* (2006.01)
*H02J 3/14* (2006.01)

(52) U.S. Cl.
CPC .................................. *H02J 3/14* (2013.01)

(58) Field of Classification Search
CPC ............. H02J 3/14; H02J 9/061; H02H 3/00
USPC ............................................ 307/29; 700/293
See application file for complete search history.

(56) References Cited

U.S. PATENT DOCUMENTS

| | | | | |
|---|---|---|---|---|
| 5,631,814 A * | 5/1997 | Zak | ........................ | H02J 9/061 307/66 |
| 6,107,698 A * | 8/2000 | Ochiai | .................... | H02J 9/005 307/43 |
| 6,184,593 B1 * | 2/2001 | Jungreis | .................. | H02J 9/062 307/64 |
| 6,212,081 B1 * | 4/2001 | Sakai | ....................... | H02J 9/061 363/55 |
| 7,683,584 B2 * | 3/2010 | Choi | ............................ | 320/163 |
| 2002/0031000 A1 * | 3/2002 | Sakai | ....................... | H02J 1/10 363/65 |
| 2005/0007082 A1 * | 1/2005 | Bretz et al. | ................... | 323/274 |
| 2011/0301771 A1 * | 12/2011 | Whittam et al. | .............. | 700/293 |

* cited by examiner

*Primary Examiner* — Jared Fureman
*Assistant Examiner* — Alfonso Perez Borroto
(74) *Attorney, Agent, or Firm* — Shumaker & Sieffert, P.A.

(57) ABSTRACT

This disclosure is directed to techniques for providing supply power to components of an electronics system, such as components of a networking device. According to these techniques, a power supply system charges a bulk capacitance of a power supply unit when the power supply unit is selectively disabled (e.g., disconnected). In this manner, when the power supply unit is again enabled, the power supply unit may provide supply power to components of the networking device faster in comparison to other techniques. In addition the power supply does not use any input power and therefore does not produce any heat loss while it is disconnected, thus saving otherwise wasted energy.

18 Claims, 5 Drawing Sheets

POWER SUPPLY FAST TURN-ON AND INCREASED HOLD-UP TIME WITHIN AN ELECTRICAL DEVICE

TECHNICAL FIELD

The invention relates generally to electronic components and, more specifically, to techniques for providing power to electronic components of a networking system.

BACKGROUND

In some examples, a networking device such as a core router may include a plurality of electronic components that perform different functions of the device. Such a networking device typically includes a power supply unit that is receives an input power supply from an external power source (e.g., power grid, battery), and output a regulated power supply that is appropriate for use by components of the networking device. For example, such a power supply unit may output a stable power supply with a current and/or voltage level that is suitable for components of the networking device to operate as desired.

In some examples, a networking device as described above may include multiple power supply units that are each configured to output a regulated power supply for use by one or more components of the networking device. In some examples, such a networking device may selectively enable or disable one or more of the multiple power supply units based on power supply requirements of the networking device during operation.

SUMMARY

In general, this disclosure is directed to techniques for providing regulated supply power to one or more components of an electrical system, such as a networking device. As described above, a typical networking device may include multiple power supply units. Such a networking device may selectively enable such a power supply unit by connecting the unit to components of the networking system, or disable the power supply unit by disconnecting the unit from components of the networking system.

For example, a power supply unit may not output a regulated power supply (voltage) when connected to a power source until a bulk capacitance of the power supply unit is charged to a predetermined level, such as a predetermined voltage level greater than zero. This delay is generally referred to as "turn-on time." In some environments, this delay before a power supply unit is operable to provide a regulated power supply to components of a networking system may be undesirable. This disclosure is directed to techniques for reducing the turn-on time for a power supply unit of an electrical system having multiple power supply units, such as a networking device. According to these techniques, when a power supply unit is not needed to supply power to components of the networking device, control logic within the networking device may disconnect the power supply unit from a power source. In addition, the control logic may configure the network device to charge a bulk capacitance of the disconnected power supply unit to a predetermined current or voltage level using one or more of the other power supplies of the network device. Accordingly, when the power supply is again enabled, the power supply may be available to power components of the networking device with little or no delay. In this manner, power supply units of such a networking device may be selectively enabled by with a faster turn-on time in comparison with other techniques. Moreover, in addition to decreasing the time that the 'sleeping" power supply takes to resume operation, having its bulk capacitors charged to the predetermined output voltage means that the energy stored in them may be drawn upon by the system. This may increases the "hold-up time," of the network device, which is the time that the device is able to maintain operation when experiencing "brown-out" condition in the power source, i.e., a momentary reduction or loss of input power.

In one embodiment, a method comprises receiving a source power supply at a power supply unit configured to supply power to at least one electronic component, and receiving, at a power supply controller coupled to the power supply unit, a disable signal that indicates the power supply unit should be disconnected such that the power supply unit does not supply power to the at least one electronic component. The method further comprises disconnecting, in response to the disable signal, the power supply unit; and charging, in response to the disable signal, a bulk capacitance of the power supply unit to a predetermined level while the power supply unit is disconnected from the source power supply.

In another embodiment, a networking device comprises a power supply system that includes a power supply unit configured to supply power to at least one electronic component and a control unit coupled to the power supply unit. The control unit is configured to receive a disable signal that indicates the power supply unit should be disconnected from the at least one electronic component such that the power supply unit does not supply power to the at least one electric component; disconnect, in response to the disable signal, the power supply unit from a source power supply; and charge, in response to the disable signal, a bulk capacitance of the power supply unit to a predetermined level while the power supply unit is disconnected from the source power supply.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
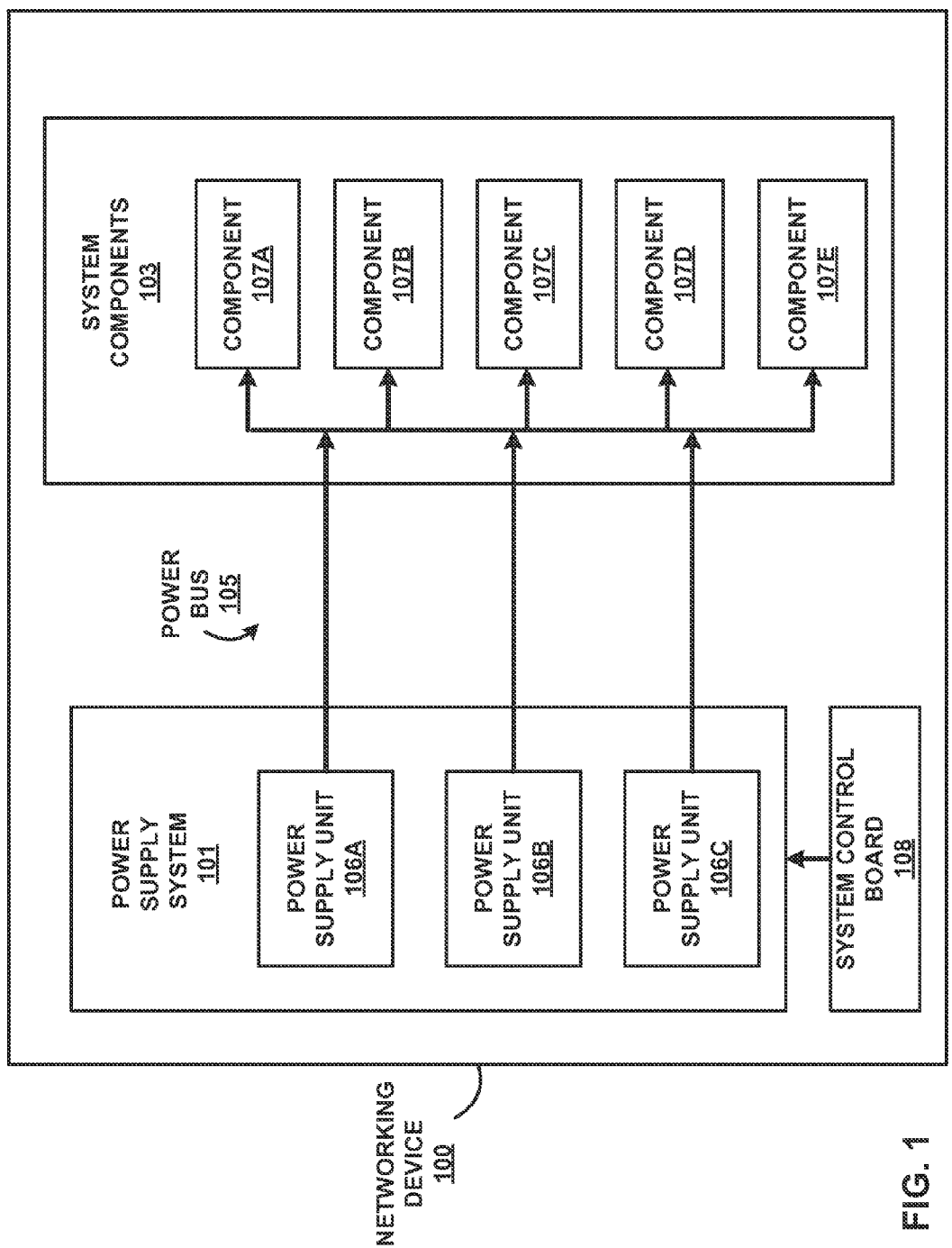
FIG. 1 is a block diagram that illustrates one example of a networking device that includes a power supply system consistent with one or more aspects of this disclosure.

FIG. 1 is a block diagram that illustrates one example of a networking device 100 that includes a power supply system 101 consistent with one or more aspects of this disclosure. According to the example, of FIG. 1, power supply system 101 includes a plurality of power supply units 106A-106C that are each configured to provide supply power to components 103 of system, such as components 107A-107E depicted in FIG. 1. Networking device 100 device 100 depicted in FIG. 1 is just one example of an electronic device or system that may include a power supply system 101 as described herein. The techniques of this disclosure may also be used to provide supply power to other electrical systems or devices.

In the example of FIG. 1, networking device 100 includes a system control board (SCB) 108. SCB 108 may control one or more aspects of device 100 operation, including the supply of power by power supply system 101. For example, SCB 108 may determine whether a level of power supplied to components 103 of system 100 should be increased or decreased, and in response send one or more control signals to enable, or disable, one or more of power supply units 106A-106C. In this manner, SCB 108 may ensure that sufficient power is available for components 107A-107E to operate as desired, while minimizing power consumption of device 100 when device 100 is not operating at full capacity.

According to typical networking devices, when SCB 108 sends a control signal that indicates a power supply unit 106A-106C is to be disabled, power supply system 101 disables the power supply by disconnecting it from components 103 of device 100, for example by creating an open circuit between the power supply unit and components 103. Disabling the power supply unit in such a manner may cause a measurable charge level of a bulk capacitance of the power supply unit to discharge over time to approach zero or close to zero. When a power supply unit disabled in this way is again enabled, by reconnecting it to components 103, lack of a bulk capacitance charge may cause a substantial delay before power is actually supplied by the re-activated power supply unit to components 103.

This disclosure is directed to systems, methods, and devices that provide for a fast turn-on time for power supply units of a power supply system. For example, according to these techniques, the power supply system charges a bulk capacitance of a disconnected power supply unit to a predetermined level, such as a voltage level greater than zero, when it has been disabled. In this manner, when the disconnected when a power supply unit 106A-106C is again enabled, the power supply unit the bulk capacitance need not necessarily first be charged before it can provide power to components. Because the bulk capacitance is already charged, the enabled power supply unit provides the power supply faster than in comparison to other techniques described above. In addition energy stored in a disabled power supply unit that has been charged to such a predetermined level may be drawn upon by the system when needed, such as when experiencing a "brown-out" condition in one or more active power sources. Drawing on such stored power may increase a "hold-up time," of network device 100, which is the time that device 100 is able to maintain operation when experiencing such a "brown-out" condition.

Figure 2:
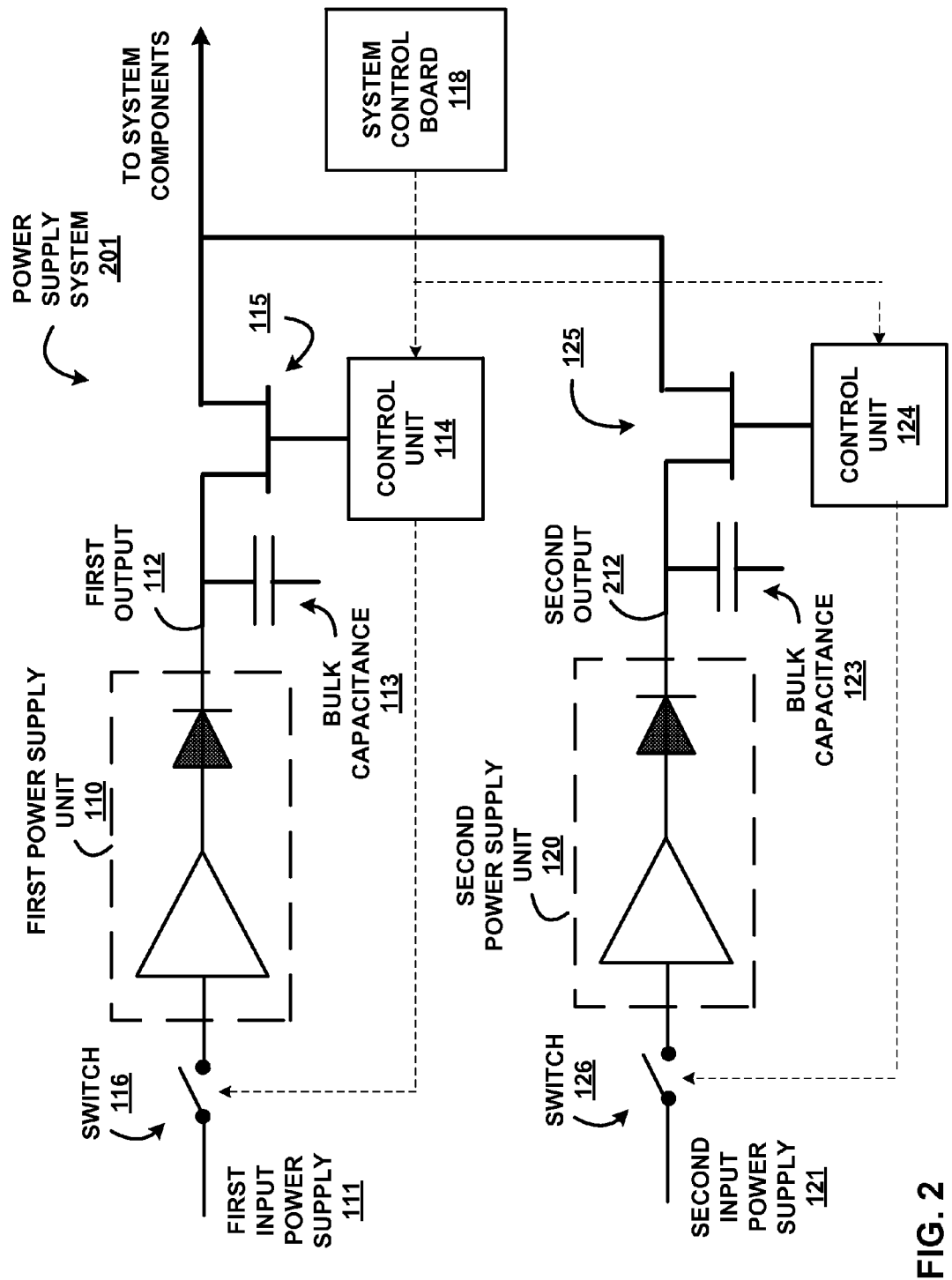
FIG. 2 is a conceptual diagram that illustrates one example of a power supply system of a networking device consistent with one or more aspects of this disclosure.

FIG. 2 is a conceptual diagram that illustrates one example of a power supply system 201 that includes a plurality of power supply units, first power supply unit 110 and second power supply unit 120. As shown in the example of FIG. 2, each of power supply units 110, 120 is configured to receive a respective power supply input 111, 121 from an external source, such as a power grid, battery, or other source of power. For example, as shown in FIG. 2, first power supply unit 110 is configured to receive a first power source 111, and provide a regulated power supply output 112 to components 103 of networking device 100 via an output 112. As also shown in FIG. 2, second power supply unit 120 is configured to receive a second power source 121 and provide a regulated power supply output 212 to components 103 via an output 122. As also shown in the example of FIG. 2, first power supply unit 110 and second power supply unit 120 are coupled to components 103 in parallel via a power distribution bus 105. Via power distribution bus 105, one or both of first and second power supply units 110, 120 may be selectively used by power supply system 201 to provide supply power to one or more of components 103. Although depicted in FIG. 2 as separate sources, in some examples power sources 111 and 121 may comprise a single power source that both power supply units 110, 120 are configured to use to output supply power to components 103.

As shown in FIG. 2, first power supply unit 110 is coupled to a first control unit 114, and second power supply unit 120 is coupled to a second control unit 124. As shown by the dashed arrows in FIG. 2, control units 114, 124 are each communicatively coupled to a system control board 118. System control board 118 comprises one or more components of an electronics system, such as a networking device, that is configured to control a power supply provided to components 103, as well as control other functionality of device 100. For example, system control board 118 may determine whether more or less power is needed to power components 103. In response to determining that more or less power is needed, system control board 118 may communicate one or more control signals to respective control units 114, 124, in order to enable or disable one or more of first power supply unit 110 and/or second power supply unit 120.

As shown in the example of FIG. 2, power supply unit 110 is associated with a first ORing transistor 115 coupled to first output 112, and power supply unit 120 is associated with a second ORing transistor 125 coupled to second output 122. As described above, according to a typical networking system, control units 114, 124 may use ORing transistors to selectively electrically connect or disconnect first or second power supply units 110, 120 from system components 103. For example, according to a typical networking device, to disable first power supply unit 110, system control board 118 may communicate a control signal to control unit 114. In response to the control signal, control unit 114 may turn ORing transistor 115 off, by applying a voltage or current to a gate terminal of ORing transistor 115, and thereby disconnect first power supply unit 110 from components 103.

As also shown in FIG. 1, first power supply unit 110 comprises a bulk capacitance at output 112. Bulk capacitance 113 may comprise a measurable capacitance that exists between first output 112 and a relative (i.e., common) or earth ground, or any other reference potential. Second power supply unit 110 also comprises such a bulk capacitance 123 at output 122.

As set forth above, for a typical networking device, in order to disable first power supply unit 110, control unit 114 may apply a current or voltage to ORing transistor 115 to thereby disconnect first power supply unit 110 from system components by causing an open circuit across the source and drain terminals of ORing transistor 115. In this state, due to the open circuit, current does not flow through first power supply unit 110. As such, a measurable bulk capacitance 113 at first output 112 may be zero or close to zero. Moreover, the charge level of bulk capacitance 113 may decay over time to a point below which first power supply unit 110 may not be immediately usable. That is, for typical networking devices, when control unit 114 causes ORing transistor 115 to be turned on (i.e., for current to flow across a p-n junction of ORing transistor 115), first power supply unit 110 may not provide a regulated power supply to system components 103 via first output 112, until bulk capacitance 113 has been charged to a sufficient charge level. This may cause an undesirable delay before a regulated power supply is available from first power supply unit 110.

The example of FIG. 2 shows a power supply system 201 that is configured to provide a faster turn-on time for power supply units 110, 120 of system 110, consistent with the techniques of this disclosure. For example, as shown in FIG. 1, first power supply unit 110 is associated with a first switch 116 coupled between an input of first power supply unit 110 and a first power source 111. As also shown in FIG. 1, second power supply unit 120 is associated with second switch 126 coupled between an input of second power supply unit 110 and second power source 121. According to the techniques described herein, control units 114, 124 may be configured to use switches 116, 126, as well as ORing transistors 115, 125, to provide for a fast turn-on time for power supply units 110, 120 as described in further detail below.

For example, according to the power supply system 201 depicted in FIG. 2, control unit 114 receives, from system control board 118, a control signal that indicates first power supply unit 110 should be disabled. In response to such a control signal, control unit 114 opens switch 116, which may disconnect first power supply unit 110 from first power source 111. In this state, first power supply unit 110 is not operative to provide a power supply to system components 103.

According to the techniques described herein, in response to receiving the disable signal from system control board 118, control circuit 114 also causes a bulk capacitance 113 of first power supply unit 110 to be charged to a predetermined voltage level. For example, control circuit 114 may cause bulk capacitance 113 to be charged via ORing transistor 115. As one example, control circuit 114 causes ORing transistor 115 to operate such that at least some current flows from second output 212 of second power supply unit 120, through ORing transistor 115, and to first output 112 of first power supply unit 110. For example, control circuit 114 may reverse-bias ORing transistor 115, in order to cause current to flow in a reverse direction through a P-N junction of ORing transistor 115, thereby charging bulk capacitance 113 to a predetermined voltage level while first power supply unit 120 is disconnected (e.g., via switch 116).

The techniques of this disclosure provide for a power supply system 201 with improved turn on time of power supply units 110, 120 in comparison to other techniques, such as those described above where power supply units are merely disconnected from system components via an ORing transistor. Instead, because bulk capacitance 113 is charged when the power supply unit 110 is disabled, the next time system control board 118 communicates an enable signal to control unit 114, power supply unit 110 can be operated to output a power supply to components 103, with little or no delay. In this manner, a turn on time of power supply unit 110 may be improved, in comparison to other techniques. In addition, charging a disabled power supply unit 110 to a predetermined level may increases the "hold-up time," of network device 100, which is the time that device 100 is able to maintain operation when experiencing "brown-out" condition in the power source The example of FIG. 2 is provided for purposes of explaining the techniques of this disclosure only, and is intended to be non-limiting. For example, a power supply system 201 is depicted in FIG. 2 that includes two power supply units 110, 112. In other examples, such a power supply system may include any different number of multiple power supply units, and each power supply unit of the power supply system may be associated with a switch and a control unit, as described above with respect to power supply unit 110. According to these examples, system control board 118 may selectively communicate enable or disable signals to each of the respective control units. In response to a disable signal, each respective control unit may disconnect the power supply unit using an associated switch, and also cause a bulk capacitance if the power supply unit to be charged while the power supply unit is disabled. In this manner, when any disabled power supply unit of such a power supply system is subsequently enabled, the power supply unit is immediately available to supply power to components associated with the power supply system.

Figure 3:
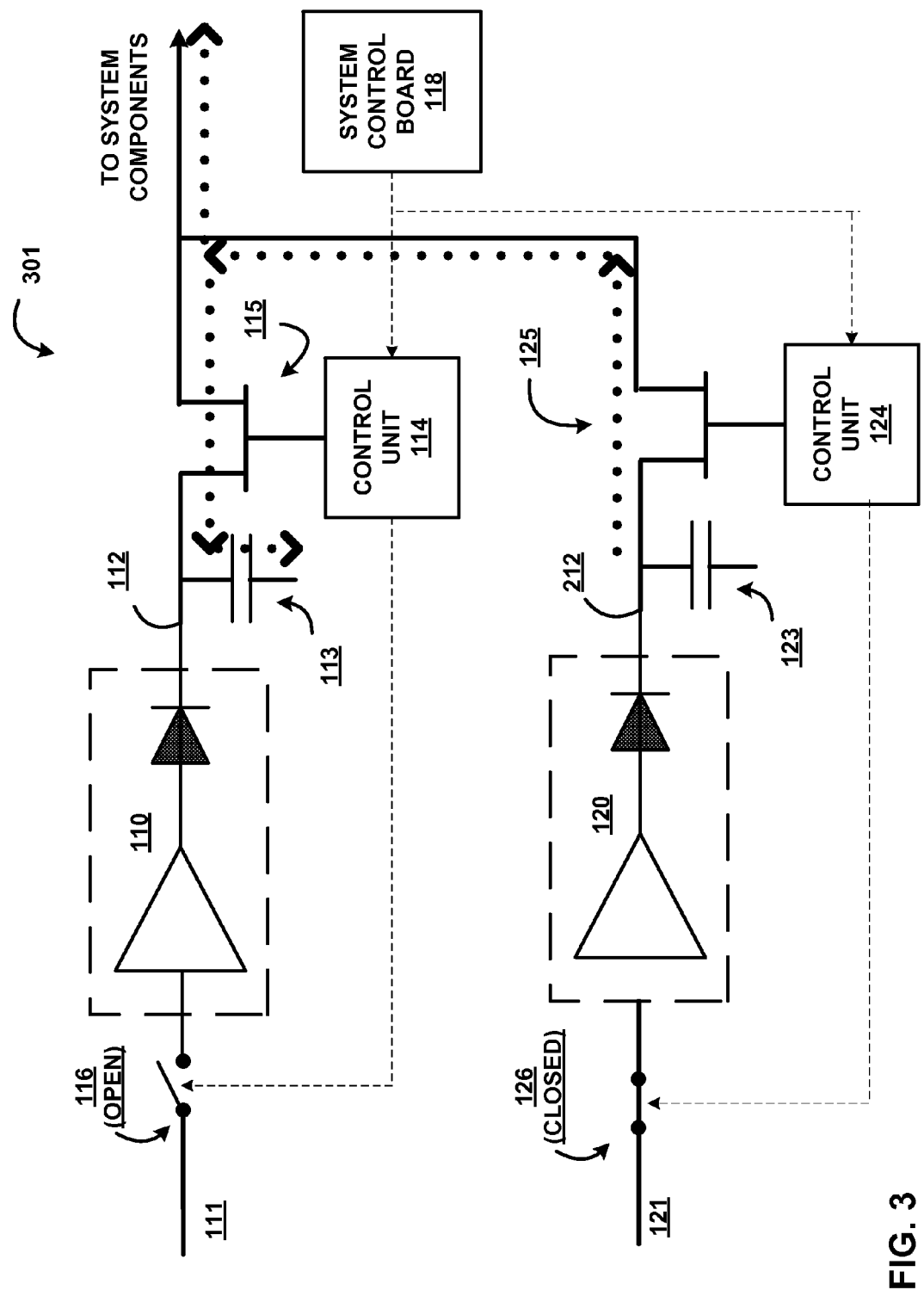
FIG. 3 is a conceptual diagram that illustrates one example of a power supply system of a networking device in operation consistent with one or more aspects of this disclosure.

FIG. 3 is a conceptual diagram that illustrates one example of a power supply system 301 of a networking device that is operating with a power supply unit 110 in a disabled stated consistent with one or more aspects of this disclosure. According to this example, second power supply unit 120 is in an active (i.e., enabled) state. For example, as shown in FIG. 3, control unit 114 has caused switch 116 associated with first power supply unit 110 to be in an open state, thereby causing first power supply unit 110 to be disconnected from first power source 111. As also shown in FIG. 3, switch 126 is in a closed state, thereby connecting second power supply unit 120 to be coupled to second power source 121 such that second power supply unit outputs a power supply to components 103. For example, the dotted arrows shown in FIG. 3 show a direction of current from second power supply unit 120 to components 103.

As also shown by the dotted line depicted in FIG. 3, consistent with the techniques described herein, control unit 114 has also caused current to flow to first power supply unit 110 in order to charge bulk capacitance 113 of first power supply unit 110 to a predetermined level, such as a predetermined voltage level. To do so, according to the example of FIG. 3, control unit 114 has caused current from second power supply unit 120 to flow across ORing transistor 115 to first power supply unit 110. For example, control unit 114 may reverse bias ORing transistor 115, thereby causing current to flow in a reverse direction through a p-n junction of ORing transistor 115.

According to the example of FIG. 3, when first power supply unit 110 is again enabled, control unit 114 closes switch 116 to couple first power supply unit 110 to power source 111. According to the techniques described herein, because control unit 114 caused bulk capacitance 113 of power supply unit 110 to be charged to a predetermined level when disabled, power supply unit 110 provides power to components 103 much faster than if bulk capacitance 113 had not been charged. In this manner, the techniques described herein provide for a faster turn-on time for power supply unit 110 in comparison to other techniques.

Figure 4:
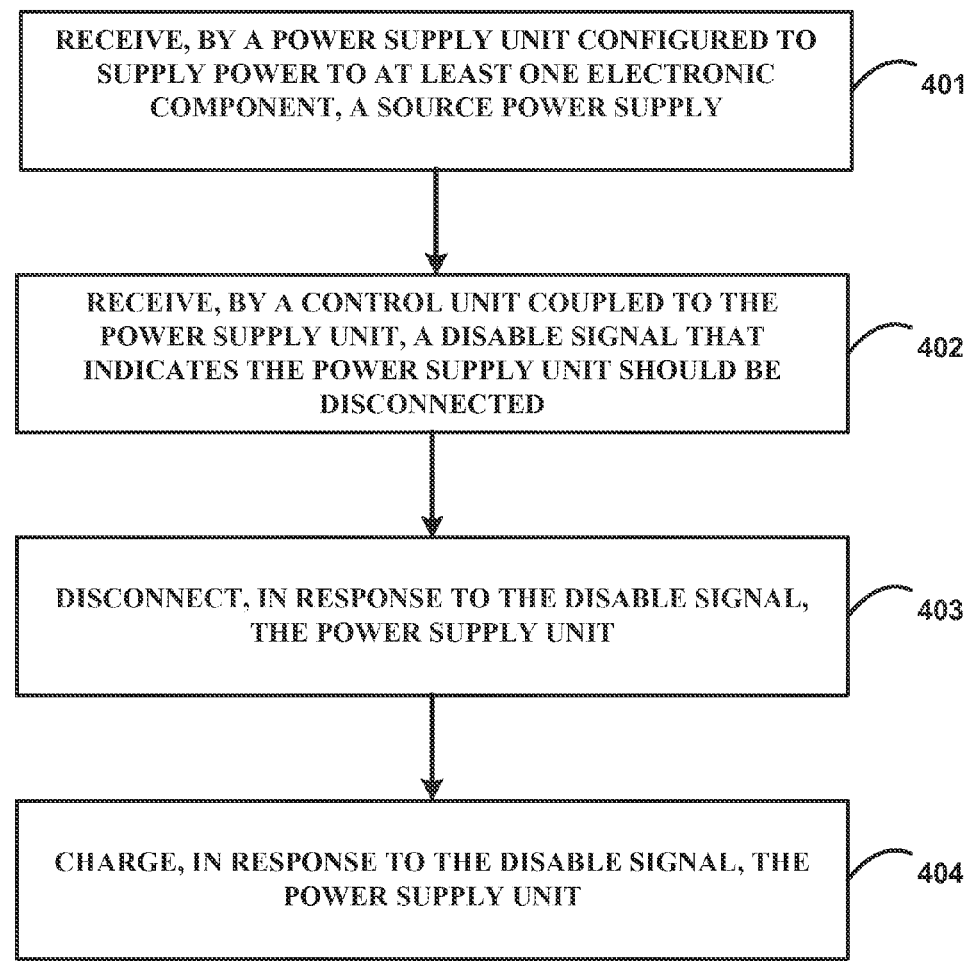
FIG. 4 is a flow diagram that illustrates one example of a method of providing a power supply to one or more components of a networking device consistent with one or more aspects of this disclosure.

FIG. 4 is a flow diagram that illustrates one example of a method of operating a power supply unit 110 of a power supply system 201 consistent with one or more aspects of this disclosure. The method of FIG. 4 is described as performed by power supply system 201 depicted in FIG. 2. In other examples, the method of FIG. 4 may be performed by any device or system, whether or not explicitly described herein. As shown in FIG. 4, a power supply unit 110 configured to supply power to at least one electronic component 103 receives a source power supply (401).

As also shown in FIG. 4, a control unit 114 coupled to the power supply unit 110 receives a disable signal that indicates the power supply unit should be disconnected such that the power supply unit does not supply power to the at least one component 103 (402). As also shown in FIG. 4, in response to the disable signal, the control unit 114 disconnects the power supply unit 110 from the power source (403). For example, the control unit 114 may disconnect the power supply unit 110 by opening a switch 116 coupled between the power supply unit 110 and the power source. As also shown in FIG. 4, in response to the disable signal, the control unit 114 charges a bulk capacitance 113 of the first power supply unit 110 to a predetermined level (e.g., a predetermined voltage level greater than zero) (404). For example, the control unit 114 may cause current generated by a second power supply unit 120 different the first power supply unit 110 to flow to the first power supply unit 110 and thereby cause the bulk capacitance 113 of the first power supply unit 110 to be charged to the predetermined level.

Although not depicted in FIG. 4, the control unit 114 may also receive an enable signal while the first power supply unit 110 is operated in a disabled state as described above. According to these examples, because the bulk capacitance 113 was charged in response to the disable signal at (404), when the first power supply is again enabled (e.g., switch 116 is closed), power supply unit 110 may provide supply power to components 103 faster than in comparison to other techniques, where the bulk capacitance 113 is not charged when first power supply 110 is disabled.

Figure 5:
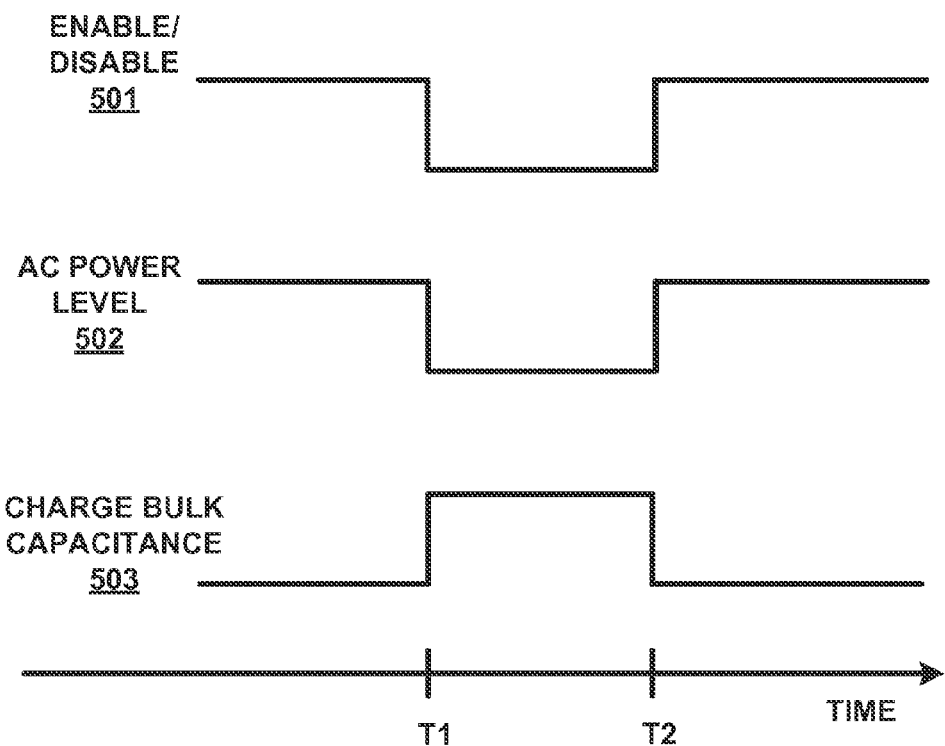
FIG. 5 is a timing diagram that illustrates one example of operation of a power supply system of a networking device consistent with one or more aspects of this disclosure.

FIG. 5 is a conceptual diagram that illustrates a timing relationship consistent with one or more aspects of this disclosure. For example, as shown in FIG. 5 control unit 114 receives an enable/disable signal 501. Control unit 114 may receive the enable disable signal 501 from SCB 108, 118 depicted FIGS. 1 and 2, respectively. According to the example of FIG. 5, the enable/disable signal has a value of 1 if power supply unit 110 is to be operated in an enabled state to provide a power supply to components 103, and a value of 0 if power supply unit 110 is to be operated in a disabled state. As shown in FIG. 5, at a time T1, enable/disable signal 501 transitions from a value of 1 to a value of zero, indicating that power supply unit 110 is to be disabled.

As also depicted in FIG. 5, in response to the transition of the enable/disable signal 501, control unit 114 disconnects power supply unit 110. For example, control unit 114 may disconnect power supply unit 110 from a power source 111, by opening a switch coupled between power supply unit 110 and power source 111. As shown in FIG. 5, at time T1, a AC voltage level 502 of power supply unit 110 has dropped to zero.

In addition, in response to the transition of the enable/disable signal 501 at time T1, as shown by the charge bulk capacitance signal 503 depicted in FIG. 5, control unit 114 charges a bulk capacitance 113 of power supply unit 110. For example, to do so, control unit 114 may operate an ORing transistor 115 coupled to power supply unit 110 such that current from another power supply unit (e.g., second power supply unit 120) charges the bulk capacitance 113 of power supply unit 110. As one specific example, control unit 114 may reverse bias ORing transistor 115, such that the bulk capacitance 113 is charged in response to the transition of the enable/disable signal 501 at time T1.

As also shown in FIG. 5, at a time T2, the enable/disable signal 501 transitions from a value of 0 to a value of 1. In response to the transition at time T2, control unit 114 again couples power supply unit 110 to power source 111 (e.g., by closing switch 116). As also shown in FIG. 5, because control circuit 114 charged bulk capacitance 115 in response to the first transition of enable/disable signal 501 at time T2, AC voltage level 502 transitions to having a non-zero voltage level with little or no delay after the second transition of the enable/disable signal 501 at time T2.

Various embodiments of the invention have been described. These and other embodiments are within the scope of the following claims.

The invention claimed is:

1. A method comprising:
    receiving a source power supply at a first power supply unit configured to supply power to at least one electronic component, wherein the first power supply unit is one of a plurality of power supply units configured to supply power to the at least one electronic component in parallel by a power distribution bus;
    receiving, at a power supply controller coupled to the first power supply unit, a disable signal that indicates the first power supply unit should be disconnected such that the first power supply unit does not supply power to the at least one electronic component;
    disconnecting, in response to the disable signal, the first power supply unit from the source power supply such that the first power supply unit does not supply power to the at least one electronic component; and
    charging, in response to the disable signal, a bulk capacitance of the first power supply unit to a predetermined level while the first power supply unit is disconnected from the source power supply by delivering power from a second power supply unit of the plurality of power supply units to the bulk capacitance of the first power supply unit via the power distribution bus while the second power supply unit supplies power to the at least one electronic component.

2. The method of claim 1, further comprising:
    using an ORing transistor coupled to an output of the first power supply to charge the bulk capacitance.

3. The method of claim 2, further comprising:
    receiving power to charge the bulk capacitance of the first power supply unit via an output of the ORing transistor that is coupled to the second power supply unit.

4. The method of claim 3, wherein using the ORing transistor to charge the bulk capacitance comprises reverse-biasing the ORing transistor such that power from the second power supply unit charges the bulk capacitance.

5. The method of claim 1, wherein disconnecting, in response to the disable signal, the first power supply unit from source power supply comprises:
    disconnecting via opening a switch coupled between the first power supply unit and the source power supply.

6. The method of claim 1, further comprising:
    receiving, at the power supply controller, an enable signal that indicates the first power supply unit should be connected to the at least one electronic component; and
    connecting, in response to receiving the enable signal, the first power supply unit to the source power supply.

7. The method of claim 6, wherein charging, in response to the disable signal, the bulk capacitance of the first power supply unit to the predetermined level causes the at least one electronic component to be powered by the first power supply unit faster once connected to the source power supply in response to the receiving the enable signal than if the bulk capacitance of the first power supply unit had not been charged to the predetermined level.

8. The method of claim 1, wherein the predetermined level comprises a voltage level.

9. A networking device, comprising:
a power supply system comprising:
  a first power supply unit and a second power supply unit configured to supply power in parallel to at least one electronic component via a power distribution bus; and
  a control unit coupled to the power supply unit configured to:
    receive a disable signal that indicates the first power supply unit should be disconnected from the at least one electronic component such that the first power supply unit does not supply power to the at least one electric component;
    disconnect, in response to the disable signal, the first power supply unit from a source power supply such that the first power supply unit does not supply power to the at least one electronic component; and
    charge, in response to the disable signal, a bulk capacitance of the first power supply unit to a predetermined level while the first power supply unit is disconnected from the source power supply by delivering power from the second power supply unit to the bulk capacitance of the first power supply unit via the power distribution bus while the second power supply unit supplies power to the at least one electronic component.

10. The device of claim 9, further comprising:
an ORing transistor coupled to the first power supply unit and the control unit, wherein the control unit uses the ORing transistor to charge the bulk capacitance to the predetermined level.

11. The device of claim 10, wherein the control unit uses power received via an output of the ORing transistor coupled to the second power supply unit to charge the bulk capacitance to the predetermined level.

12. The device of claim 11, wherein the control circuit reverse-biases the ORing transistor such that power from the second power supply unit charges the bulk capacitance.

13. The device of claim 9, wherein the control unit disconnects the first power supply unit using a switch.

14. The device of claim 9, wherein the control unit:
receives an enable signal that indicates the first power supply unit should be connected to the at least one electronic component; and
connects, in response to the received enable signal, the first power supply unit such that the first power supply unit supplies power to the at least one electric component.

15. The device of claim 9, wherein the predetermined level comprises a voltage level.

16. A networking device comprising:
means for receiving a source power supply;
a first means for outputting a regulated supply power derived from the source power supply to at least one electronic component over a power distribution bus;
a second means for outputting a regulated supply power to the at least one electronic component over the power distribution bus in parallel with the first means;
means for receiving a disable signal that indicates the regulated supply power corresponding to the first means should be not be output such that the at least one electronic component does not receive the regulated supply power;
means for not outputting, in response to the disable signal, the regulated supply power corresponding to the first means; and
means for charging, in response to the disable signal and by delivering the regulated supply power from the second means to a bulk capacitance of the first means to a predetermined level while not outputting the regulated supply power from the first means to the at least one electronic component, wherein the bulk capacitance is associated with the first means for outputting the regulated supply power.

17. The method of claim 1, wherein charging, in response to the disable signal, the bulk capacitance of the first power supply unit to the predetermined level reduces a turn-on time of the first power supply unit.

18. The device of claim 9, wherein the control unit coupled to the first power supply unit is configured to reduce a turn-on time of the first power supply unit by being configured to charge, in response to the disable signal, the bulk capacitance of the first power supply unit to the predetermined level while the first power supply unit is disconnected from the source power supply.

* * * * *